US009679331B2

(12) United States Patent
Gottlieb

(10) Patent No.: US 9,679,331 B2
(45) Date of Patent: Jun. 13, 2017

(54) SYSTEMS AND METHODS FOR DYNAMICALLY CONTROLLING VISUAL EFFECTS ASSOCIATED WITH ONLINE PRESENTATIONS

(71) Applicant: SHINDIG, INC., New York, NY (US)

(72) Inventor: Steven M. Gottlieb, New York, NY (US)

(73) Assignee: SHINDIG, INC., New York, NY (US)

( * ) Notice: Subject to any disclaimer, the term of this patent is extended or adjusted under 35 U.S.C. 154(b) by 719 days.

(21) Appl. No.: 14/051,133

(22) Filed: Oct. 10, 2013

(65) Prior Publication Data

US 2015/0106227 A1    Apr. 16, 2015

(51) Int. Cl.
G06Q 30/06 (2012.01)
H04N 7/15 (2006.01)
G09B 5/00 (2006.01)

(52) U.S. Cl.
CPC ..... *G06Q 30/0643* (2013.01); *G06Q 30/0633* (2013.01); *G09B 5/00* (2013.01); *H04N 7/15* (2013.01)

(58) Field of Classification Search
CPC .............. G06Q 30/0643; G06Q 30/0633
See application file for complete search history.

(56) References Cited

U.S. PATENT DOCUMENTS

| | | | |
|---|---|---|---|
| 7,007,235 B1 * | 2/2006 | Hussein | G06Q 10/10 715/751 |
| 8,230,355 B1 * | 7/2012 | Bauermeister | G06F 3/0481 715/765 |
| 8,390,670 B1 * | 3/2013 | Gottlieb | H04N 7/15 348/14.08 |
| 8,558,868 B2 * | 10/2013 | Prentice | H04N 7/147 235/377 |
| 8,635,293 B2 * | 1/2014 | Fisher | H04L 51/16 709/204 |
| 2002/0143877 A1 * | 10/2002 | Hackbarth | G06Q 10/107 709/205 |
| 2006/0002315 A1 * | 1/2006 | Theurer | G06F 3/0481 370/261 |

(Continued)

FOREIGN PATENT DOCUMENTS

WO    2012021901 A    2/2012

OTHER PUBLICATIONS

Blackboard collaborate User's Guide, 2011.*

(Continued)

*Primary Examiner* — Amy M Levy
(74) *Attorney, Agent, or Firm* — Robert W. Morris; Eckert Seamans Cherin & Mellott, LLC

(57) ABSTRACT

Various embodiments are provided generally relating to controlling visual effects associated with online presentations. In some embodiments, an online presentation can be provided from a presenter to a plurality of users accessing a user interface displaying the online presentation. In response to providing the online presentations, a background setting of each user can automatically change from a first state to a second state. Furthermore, in response to providing the online presentation, the presenter and each user accessing the user interface can be placed in an active mode of communication which can enable live video communications to be transmitted from the presenter to each of the plurality of users.

26 Claims, 11 Drawing Sheets

(56) References Cited

U.S. PATENT DOCUMENTS

| | | | |
|---|---|---|---|
| 2007/0186171 A1* | 8/2007 | Junuzovic | G06Q 10/10 715/751 |
| 2007/0234220 A1* | 10/2007 | Khan | G06F 3/0481 715/745 |
| 2008/0136898 A1 | 6/2008 | Eisenberg et al. | |
| 2009/0204906 A1* | 8/2009 | Irving | H04N 7/15 715/753 |
| 2009/0210789 A1* | 8/2009 | Thakkar | H04L 65/605 715/719 |
| 2009/0254843 A1* | 10/2009 | Van Wie | H04L 12/1822 715/757 |
| 2009/0288007 A1* | 11/2009 | Leacock | G06Q 10/10 715/716 |
| 2010/0122184 A1 | 5/2010 | Vonog et al. | |
| 2010/0131868 A1* | 5/2010 | Chawla | G06F 3/044 715/759 |
| 2010/0316232 A1 | 12/2010 | Acero et al. | |
| 2011/0060992 A1* | 3/2011 | Jevons | H04M 7/0024 715/719 |
| 2011/0185286 A1* | 7/2011 | Moyers | G06Q 10/10 715/752 |
| 2011/0270922 A1* | 11/2011 | Jones | G06F 3/0486 709/204 |
| 2011/0279634 A1* | 11/2011 | Periyannan | H04N 7/141 348/14.09 |
| 2012/0060101 A1 | 3/2012 | Vonog et al. | |
| 2012/0182384 A1* | 7/2012 | Anderson | H04L 12/1827 348/14.09 |
| 2012/0198334 A1 | 8/2012 | Surin et al. | |
| 2012/0272162 A1 | 10/2012 | Surin et al. | |
| 2013/0014027 A1 | 1/2013 | Lemmey | |
| 2013/0021431 A1 | 1/2013 | Lemmey et al. | |
| 2013/0024785 A1* | 1/2013 | Van Wie | G06F 3/04815 715/753 |
| 2013/0063542 A1* | 3/2013 | Bhat | H04N 7/15 348/14.03 |
| 2013/0073978 A1* | 3/2013 | Butler | H04L 67/38 715/741 |
| 2013/0169742 A1* | 7/2013 | Wu | H04N 7/152 348/14.08 |
| 2013/0173531 A1* | 7/2013 | Rinearson | G06F 17/30011 707/608 |
| 2013/0254287 A1* | 9/2013 | Biswas | H04L 65/403 709/204 |
| 2015/0106750 A1* | 4/2015 | Konami | G06F 17/24 715/759 |

OTHER PUBLICATIONS

WebEx Meeting Center User's Guide, 2007.*

MacDonald, Heidi. Shindig Offers Authors Interactive Video Conferencing. Blog posted Sep. 12, 2012 at Publishers Weekly. Retrieved from [http://publishersweekly.com] on [Aug. 15, 2016]. 5 pages.*

Shindig. various informational pages published as of Jul. 21, 2012 retrieved via Internet Archive from [http://shindigevents.com] on [Aug. 5, 2016].*

Slideshare. Shindig Magazine Video Chat Events. Slide presentation published Oct. 9, 2012. Retrieved from [http://slideshare.net] on [Aug. 11, 2016]. 11 pages.*

Lu et al. CuteChat: A Lightweight Tele-immersive Video Chat System. Proceedings MM'11, Nov. 28-Dec. 1, 2011, Scottsdale, Arizona, USA. ACM 978-1-4503-0616-4/11/11. p. 1309-1312.*

O'Hara et al. Blended Interaction Spaces for Distributed Team Collaboration. ACM Trans. Comput.-Hum. Interact. 18, 1, Article 3 (Apr. 2011), 28 pages.*

Roussel et al. Beyond "Beyond Being There": Towards Multiscale Communication Systems. Proceedings MM'07, Sep. 23-28, 2007, Augsburg, Bavaria, Germany. Copyright 2007 ACM 978-1-59593-701-8/07/0009. p. 238-246.*

Junuzovic et al. Requirements and Recommendations for an Enhanced Meeting Viewing Experience. Proceedings MM'08, Oct. 26-31, 2008, Vancouver, British Columbia, Canada. Copyright 2008 ACM 978-1-60558-303-7/08/10. p. 539-548.*

Yao et al. FocalSpace: Multimodal Activity Tracking, Synthetic Blur and Adaptive Presentation for Video Conferencing. Proceedings SUI'13, Jul. 20-21, 2013, Los Angeles, California, USA. Copyright © ACM 978-1-4503-2141-9/13/07. p. 73-76.*

* cited by examiner

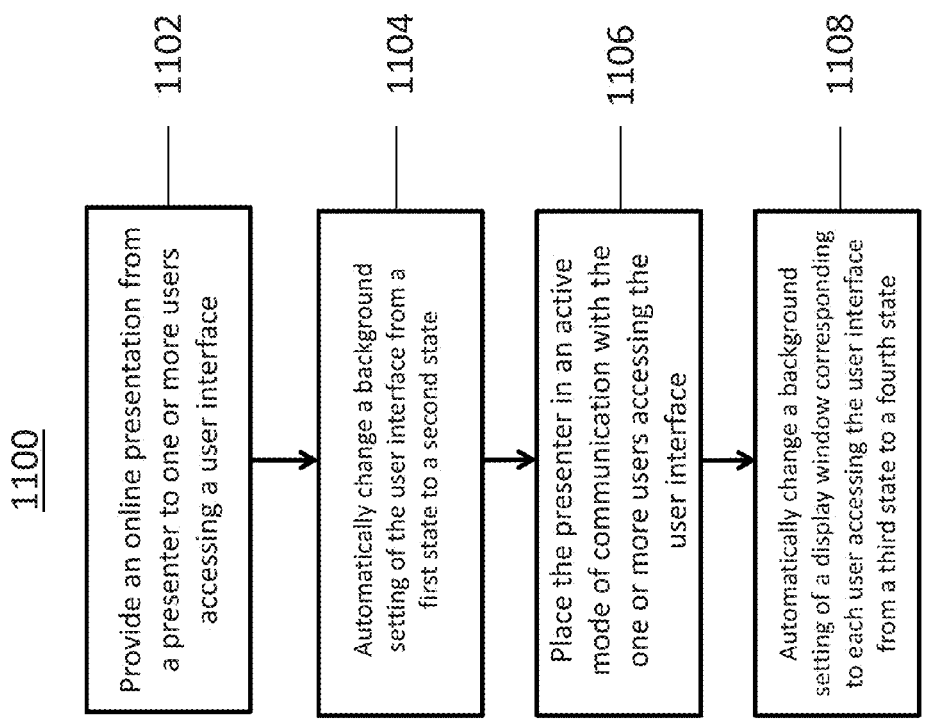

SYSTEMS AND METHODS FOR DYNAMICALLY CONTROLLING VISUAL EFFECTS ASSOCIATED WITH ONLINE PRESENTATIONS

FIELD OF THE INVENTION

Various embodiments generally relate to systems, methods, and non-transitory computer readable mediums for dynamically controlling visual effects associated with online presentations.

BACKGROUND OF THE INVENTION

In general, presentations and demonstrations typically can involve one or more presenter presenting content to one or more individuals. The receipts of the content provided by the presenter(s) may sometimes be referred to as an audience. For example, teachers can present educational material to students in a classroom or lecture hall environment. As another example, conference speakers can present intellectual or business presentations to conference attendees. As yet another example, musicians can play music to concert-goers at concerts or other musical events.

In many instances, such as those described above, the presentations require the presenter and individuals to all be centrally located, such as in a classroom or music hall. However, as technology has improved, many presentations can now be presented both live to a physical audience in a centralized location and/or streamed live over one or more communication networks. These new platforms may now allow individuals who may not be able to travel to the location site of the presentation to have access the presentation's content.

Unfortunately, the aforementioned examples have some inherent limitations. Individuals accessing a presentation away from the presentation's location site may not receive the same user experience as individuals who are physically present at the location site. Thus, it would be beneficial to provide systems, methods, and computer readable mediums that can allow individuals accessing a live video feed of a presentation to experience the full effects and benefits of the presentation as if they were physically present at the presentation.

SUMMARY OF THE INVENTION

This generally relates to systems, methods, and non-transitory computer readable mediums for dynamically controlling visual effects during an online presentation. Presentations often include one or more individuals, commonly referred to as presenters, who may presents content to one or more individuals, collectively known as an audience. In some embodiments, the presenter may be referred to as a host or hosts. For example, the presenter may correspond to a teacher presenting lecture materials to a group of students in a classroom. As another example, the presenter may correspond to a speaker at a conference presenting intellectual or business materials to an audience composed of other conference attendees. As yet another example, the presenter correspond to a musician or band playing music to a concert audience.

In some embodiments, when the presenter begins to present content to one or more individuals, various visual effects may occur in the room or rooms associated with the presentation. For example, prior to a band taking the stage at a concert, the lights of a concert venue may be fully lit. However, once the band takes the stage and begins to play music, the house lights may dim and new lighting schemes may appear to focus the audience towards the stage where the band is performing. As another example, prior to a teacher beginning a lecture within a lecture hall, the audience members (e.g., students) may be free to converse with one another. However, once the teacher begins to lecture, the students may no longer be able to freely converse with each other and now may focus (or should focus) on the teacher's lecture.

As technology continues to improve, many of the aforementioned situations have migrated from being solely in-person events to being either a hybrid of an in-person and an online event or a completely online event. For example, continuing the aforementioned example involving a musician or band playing music to concert-goers, individuals who are not able to attend the concert in person may now be able to stream the concert live over the internet or through their TV. These individuals, however, would benefit from experiencing the full effects provided to the individuals physically attending the concert, such as the feeling of anticipation once the house lights begin to dim prior to the band taking stage.

As such, various systems, methods, and non-transitory computer readable mediums can be provided that allow a user or users to receive presented content and, in response to receiving the content, have one or more of their settings changed. For example, an individual or individuals streaming a concert online may have their respective display window fully lit prior to the concert beginning. Once the concert begins, their display window may become dimmed to indicate that the concert has begun. This can provide the individuals with the sense of being physically present at the concert even though they may be enjoying the concert from the comforts of their own home.

BRIEF DESCRIPTION OF THE DRAWINGS

The above and other features of the present invention, its nature and various advantages will be more apparent upon consideration of the following detailed description, taken in conjunction with the accompanying drawings in which:

FIG. 11 is an illustrative flowchart of a process for modifying background of user display windows within a user interface associated with an online presentation in accordance with some embodiments.

DETAILED DESCRIPTION OF THE INVENTION

The present invention may take form in various components and arrangements of components, and in various techniques, methods, or procedures and arrangements of steps. The referenced drawings are only for the purpose of illustrated embodiments, and are not to be construed as limiting the present invention. Various inventive features are described below that can each be used independently of one another or in combination with other features.

Figure 1:
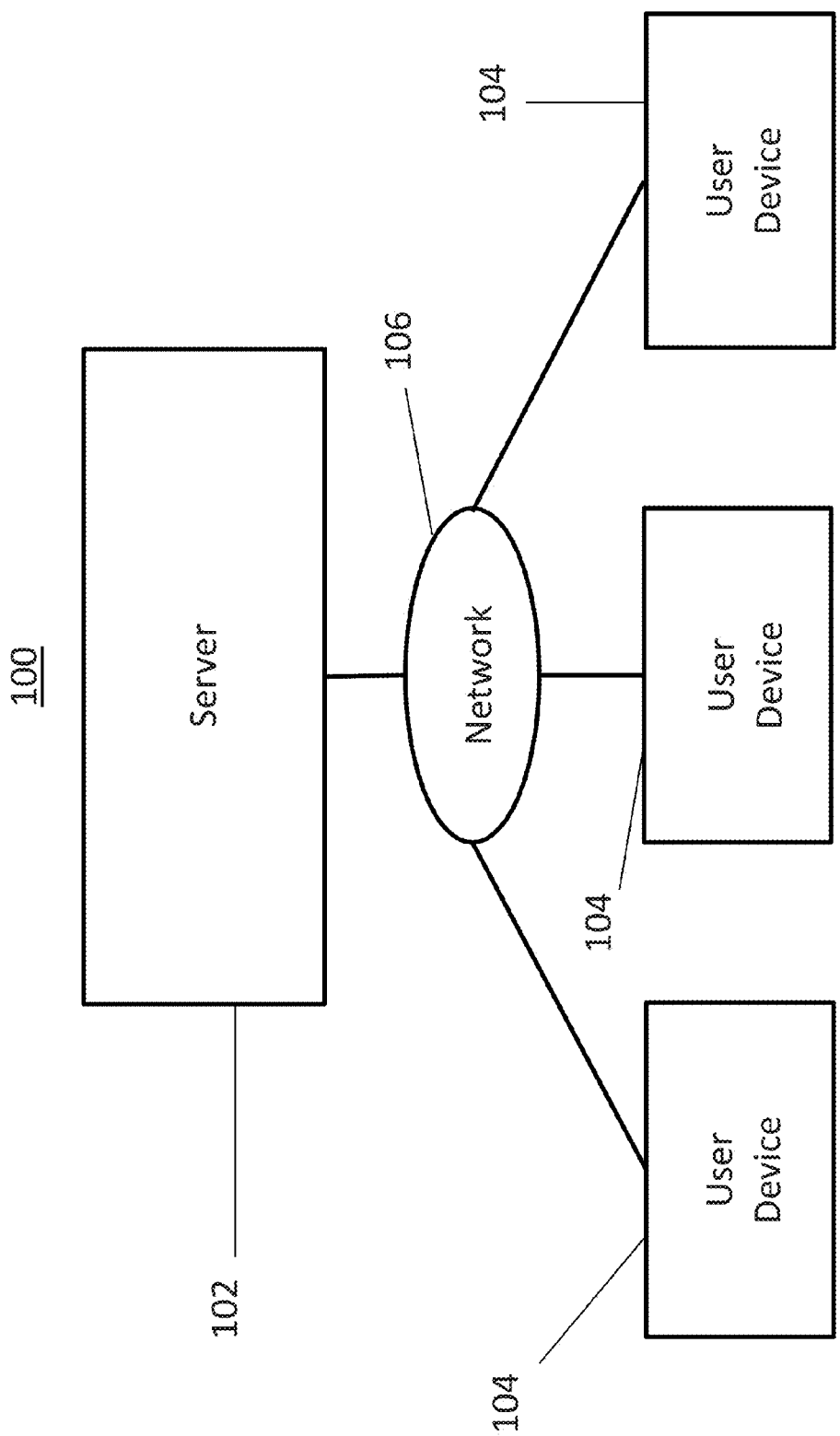
FIG. 1 is a block diagram depicting a system in accordance with various embodiments.

FIG. 1 is a block diagram depicting a system in accordance with some embodiments. System 100 can include server 102 and user devices 104 that can communicate over network 106. Although only three user devices 104 are shown in FIG. 1, it should be understood that any number of user devices may be permitted to access server 102.

Server 102 can be any number of servers suitable to facilitate communications and/or service request from user devices 104. User devices 104 can send and/or receive data from server 102 via network 106. Network 106 can be any network, combination of networks, or network devices that can carry data communications. For example, network 106 can be any one or any combination of LAN (local area network), WAN (wide area network), telephone network, wireless network, point-to-point network, star network, token ring network, hub network, or any other configuration. Network 106 can support any number of protocols such as, for example, Wi-Fi (e.g., a 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDEN, LTE or any other suitable cellular network protocol), infrared, TCP/IP (e.g., any of the protocols used in each of the TCP/IP layers), HTTP, BitTorrent, FTP, RTP, RTSP, SSH, Voice over IP (VOIP), any other communication protocol, or any combination thereof. In some embodiments, network 106 can provide wired communications paths for user devices 104.

User device 104 can be any electronic device or system capable of communicating over the network with server 102 and/or with one or more additional user devices 104. For example, user devices 104 may be portable media players, cellular telephones, pocket-sized personal computers, personal digital assistants ("PDAs"), desktop computers, laptop computers, and/or tablet computers. User devices 104 can include control circuitry, display circuitry, storage, memory, communications circuitry, input and/or output interfaces as well as additional features not shown. Furthermore, one or more components of user devices 104 can be combined or omitted.

Although examples of embodiments may be described for a user-server model with a server servicing requests of one or more user applications, persons of ordinary skill in the art will recognize that other models (e.g., peer-to-peer) are available for implementation of the described embodiments. For example, a user application executed on user device 104 may handle requests independently and/or in conjunction with server 102.

Figure 2:
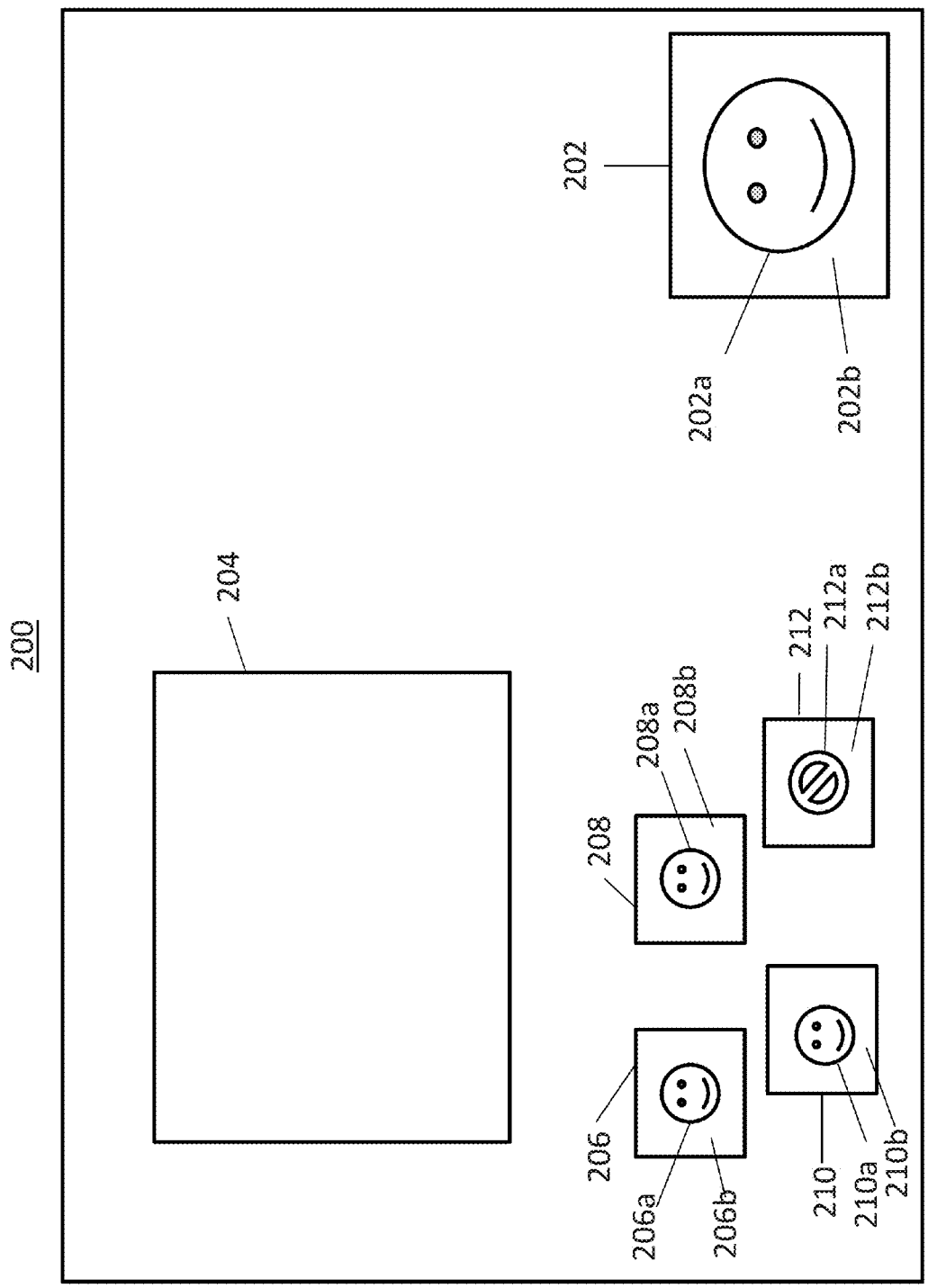
FIG. 2 is an illustrative diagram of user interface displayed on a user device in accordance with various embodiments.

FIG. 2 is an illustrative diagram of a user interface displayed on a user device in accordance with various embodiments. User interface 200 can be displayed to one or more users on a user interface of a user device (e.g., user device 104 of FIG. 1). Any user attempting to access content presented content on the user interface may be presented with a user interface substantially similar to user interface 200.

In some embodiments, user interface 200 can include display window 202. In some embodiments, display window 202 can correspond to a first user accessing user interface 200 using user device 104. In some embodiments, display window 202 may include image 202a, which may correspond to the first user. Image 202a can be any image including, but not limited to, live videos, stored videos, captured images, stored images, or any other type of image, or any combination thereof. In some embodiments, display window 202 may also include background 202b, which may correspond to the live video used to obtain image 202a. Background 202b can also include any type of background image including, but not limited to, recorded videos, live videos, captured images, stored images, or any other type of background image, or any combination thereof.

In some embodiments, user interface 200 can include content window 204. Content window 204 can present content to users accessing user interface 200, such as the first user corresponding to display window 202. For example, a user may be taking part in a lecture for an online class accessed via server 102 of FIG. 1. Content window 204 may present the lecture to the user during the online class. As seen in one particular embodiment depicted in FIG. 2, content window 204 may not continually display content. In some embodiments, if no content has been presented within content window 204, display window 202 may have background 202b displayed in a first state. Various modes of the first state may include, but are not limited to, a fully lit background, a still image of the user, or the display window being enlarged, or any combination thereof.

In some embodiments, user interface 200 can also include additional display windows, such as display windows 206, 208, 210, and 212. Display windows 206, 208, 210, and 212 may each correspond to additional users accessing content to be provided within content window 204. The additional users, corresponding to additional display windows 206, 208, 210, and 212, may each be presented with a user interface substantially similar to user interface 200, with the exception that each user's respective display window may have one or more similar features as that of display window 202. For example, a user corresponding to display window 206 may be presented with a user interface on their user device that is substantially similar to user interface 200, with the exception that their display window may located where display window 202 would be located.

In some embodiments, display windows 206, 208, 210, and 212 may include images 206a, 208a, 210a, and 212a, respectively, which may be substantially similar to image 202a. In some embodiments, if a user, such as the user corresponding to display window 212, accesses user interface 200 via a user device that does not include a camera, then that user's image (e.g., image 212a) can correspond to a blank screen, a static image, or a stored image, or any other type of image with the exception of a live image.

In some embodiments, display windows 206, 208, 210, and 212 may also include backgrounds 206b, 208b, 210b, and 212b, respectively. In some embodiments, backgrounds 206b, 208b, 210b, and 212b may each be substantially similar to background 202b of display window 202, and the previous description may apply. For example, backgrounds 206b, 208b, 210b, and 212b may be in the first state corresponding to a fully lit background.

As an illustrative example, FIG. 2 may correspond to a scenario where one or more users are participating in and/or viewing an online concert. Each participating user may be presented with a screen that may be substantially similar to user interface 200 of FIG. 2. A first user, corresponding to a first user device, may have a first display window presented within the user interface (e.g., display window 202 of FIG. 2), while any addition concert goers, corresponding to any additional user devices, may each have an additional display window presented within the user interface (e.g., display windows 206, 208, 210, and/or 212 of FIG. 2). Prior to the concert beginning, each user may be able to freely communicate with other online concert goers via their corresponding display windows. In this scenario, each display window may be in a first state (e.g., a display window having a fully lit background), which may signify that the user may be able to transmit and/or receive communications from one or more additional users accessing the user interface.

In some embodiments, although not shown in FIG. 2, user interface 200 may include a display window corresponding to a presenter who is presenting content presented within content window 204. In some embodiments, the presenter's display window may be slightly larger than the other display windows displayed within user interface 200. In some embodiments, a larger display window may signify that the particular display window may be associated with the presenter. In some embodiments, any additional user accessing user interface 200 (e.g., display window 202, 206, 208, 210, and/or 212) may also correspond to the presenter, and their display window may be displayed as the presenter's display window. In some embodiments, the presenter's display window may displayed within user interface 200. For example, the presenter may correspond to a musical group. In this scenario, content window 204 may present the entire band playing music, thus a single display window for the presenter may not be required.

In some embodiments, content window 204 may include one or more interactive buttons controlling one or more settings associated with the presented content. For example, content window 204 may include one or more interactive buttons capable of controlling the volume of the presented content. As another example, content window 204 may include one or more interactive buttons capable of displaying content window 204 in a full screen mode. In the full screen mode, the content window 204 may occupy the entirety of the user interface displayed on a display of the user device In some embodiments, user interface 200 may include one or more interactive buttons that may allow the user to select a bandwidth setting for receiving and/or transmitting content capable of being presented within content window 204. Various bandwidth settings may include one or more options for streaming content using high bandwidth (e.g., 2500 Kbps), medium bandwidth (e.g., 1500 Kbp), and/or low bandwidth (e.g., 800-1000 Kbps). The user can select a particular bandwidth that may be appropriate for their particular internet configurations, allowing the most fluid and smooth presentation of content. In some embodiments, the presented content's form can be modified depending on the selected bandwidth. For example, a low bandwidth setting may allow for intermittent video to be provided to the user device(s). In some embodiments, the bandwidth available to the user may change over time. As the available bandwidth changes, the selected bandwidth settings may correspondingly change to provide a fluid transmission of content to the user or users.

In some embodiments, user interface 200 may include one or more interactive buttons that may allow the user to export some or all of the presented content to, or invite additional users to view the presented content using, one or more social media networks. For example, the user may decide that a friend or friends of the user might be interested in a particular online event in which they are participating. In some embodiments, the user may send an invitation to the friend or friends, allowing them the option of joining the online event. For example, the user may select a "Share Using" button located on user interface 200, which may provide a link, an email containing a link, a text message, and/or an instant message to the one or more friends notifying them of the event's occurrence and that they can join the event by performing one or more actions described within the provided message.

Figure 3:
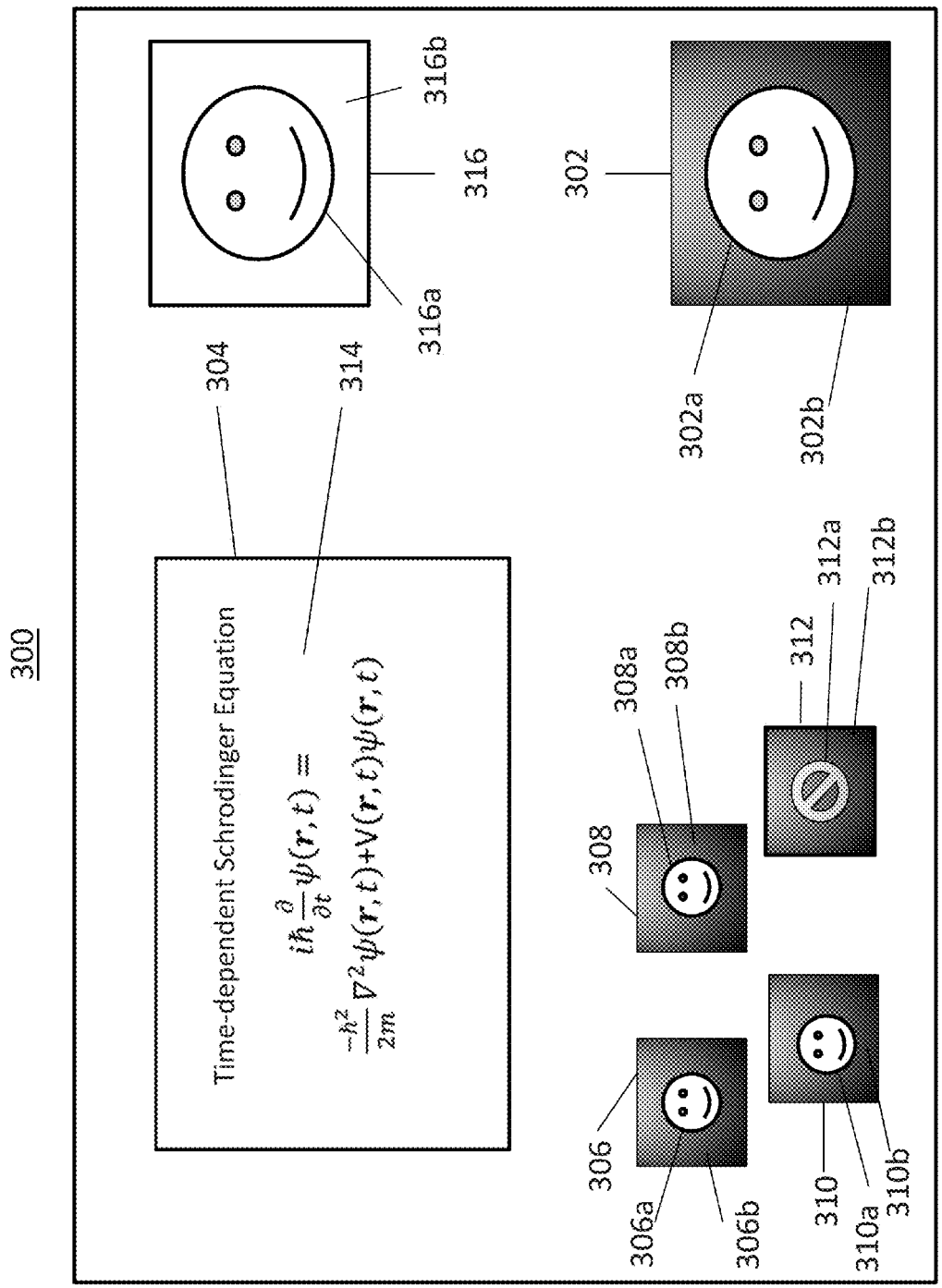
FIG. 3 is another illustrative diagram of a user interface displayed on a user device in accordance with various embodiments.

FIG. 3 is an illustrative diagram of a user interface in accordance with various embodiments. User interface 300 may include content window 304. Content window 304 may be substantially similar to content window 204 of FIG. 2 with the exception that content window 304 may include content 314 displayed therein. Content 314 may be any type of content capable of being transmitted and/or presented to one or more users accessing user interface 300. For example, content 314 may be a slide from a slideshow, a lecture, live video, recorded video, live audio, recorded audio, or any other type of presentable content, or any combination thereof. In some embodiments, content 314 may be interactive enabling the presenter to augment, modify, and/or interface with one or more portions of content 314. The augmented, modified, and/or interacted content may be presented to the one or more users accessing user interface 300.

As an illustrative example—a teacher may present a mathematical proof to one or more students participating in an online class. The teacher may begin with an equation and, line by line, present additional content to the equation to determine a solution. As the teacher adds each line, the content may be transmitted in real time to each students accessing user interface 300. Furthermore, the teacher may ask one or more students participating to "come to the board" to solve or help solve the equation. A student asked to "come to the board" may add content to the already presented content, and the added content may be transmitted to each user accessing user interface 300 so that each participating student may follow along. This can be extremely beneficial for teachers and students, as more and more classes are being offered and taken in an online format. Additionally, benefits may be provided to students who are not able to attend a physical class due to a variety of reasons (e.g., illness), but still would like to learn the material and/or participate in the class.

In some embodiments, user interface 300 may include display windows 302, 306, 308, 310, and 312 which may be substantially similar to display windows 202, 206, 208, 210, and 212 of FIG. 2, with the exception that the display windows' backgrounds may differ. For example, previously described backgrounds 202b, 206b, 208b, 210b, and 212b may be in a first state corresponding to no content being displayed within content window 204. However, user interface 300 may include content window 304 presenting content 314. In this scenario, backgrounds 302b, 306b, 308b, 310b, and 312b may change accordingly to a second state. In some embodiments, the second state may correspond to one or more display windows having a dimmed background. This can allow users accessing user interface 300 to feel and experience a situation as though they are physically present at the physical event where content 314 may be presented. In some embodiments, the second state may correspond to one or more display windows having a background that is darker relative to the background of the display windows corresponding to the first state. In some embodiments, the second state may correspond to any background that may be different from the first state (e.g., live video, recorded video, live image(s), recorded image(s), static images, etc.). In some embodiments, the second state may be substantially similar to the first state.

In some embodiments, the display window backgrounds 302b, 306b, 308b, 310b, and 312b may change to the second state in response to content 314 being presented. For example, backgrounds 302b, 306b, 308b, 310b, and 312b may change to the second state automatically and/or simultaneously once it has been determined that content window 304 includes content 314. As another example, the display window backgrounds 302b, 306b, 308b, 310b, and 312b may change to the second state and, in response to the change, content 314 may be presented within content window 304.

In some embodiments, upon a determination that the background has changed from the first state to the second state, each user accessing user interface 300 (e.g., users corresponding to display windows 302, 306, 308, 310, and/or 312) may be placed in an active mode of communication with one or more of the other users accessing user interface 300. The active mode of communication may enable live video communication to be transmitted from the presenter to one or more users accessing user interface 300 (e.g., each user corresponding to a display window). The presenter may transmit content 314 to each user accessing user interface 300 and each user may be placed in the active mode of communication with the presenter. For example, the presenter may begin presenting content 314) to one or more users accessing user interface 300 and, in response, each user's display window (e.g., display window 302) may be placed in an active mode of communication with the presenter. In some embodiments, the presented content may be given a higher priority level then other content or applications transmitted to and/or accessed by the user. This may provide a higher confidence level to the presenter (and/or any additional user) that the recipient will indeed receive the presented content.

In some embodiments, user interface 300 may include display window 316, which may correspond to a presenter. Display window 316 may, in some embodiments, include image 316a and background 316b. Display window 316, image 316a, and background 316b may, in some embodiments, be substantially similar to display window 302, image 302a, and background 302b, and the previous description may apply. In some embodiments, background 316b may be in the first state, which may correspond to the presenter being in an active mode of communication with each user accessing user interface 300. By the presenter being in an active mode of communication with each user, the presenter's content (e.g., content 314) may be given a higher priority, allowing a higher confidence level to be realized that each user accessing user interface 300 receives content 314. In some embodiments, background 316b may be in another state (e.g., the second state) and/or include any suitable background. In further embodiments, user interface 300 may not include window 316 and the presenter may present content 314 to users accessing user interface 300 without having a dedicated display window corresponding to the presenter.

Continuing the illustrative example previously described regarding online concerts—once the online concert begins, content window 304 may begin to present the concert to each concert-goer accessing user interface 300. In response to the concert being presented, each concert-goer's display window background may change from being fully lit to being dimmed. Changing the background of each concert-goer's display window may allow each concert-goer to accessing the online concert to obtain the feeling and experience as if they are physically present at the live concert. This can provide a substantially similar effect felt by an audience member at the physical concert when a band begins to play music and the house lights dim. Furthermore, each concert-goer may receive the concert at a higher priority level than other communications. This can also add to the general ambiance and experience of provided to the online concert-goer because they may now feel the same experience as a concert-goer physically present at the concert.

Figure 4:
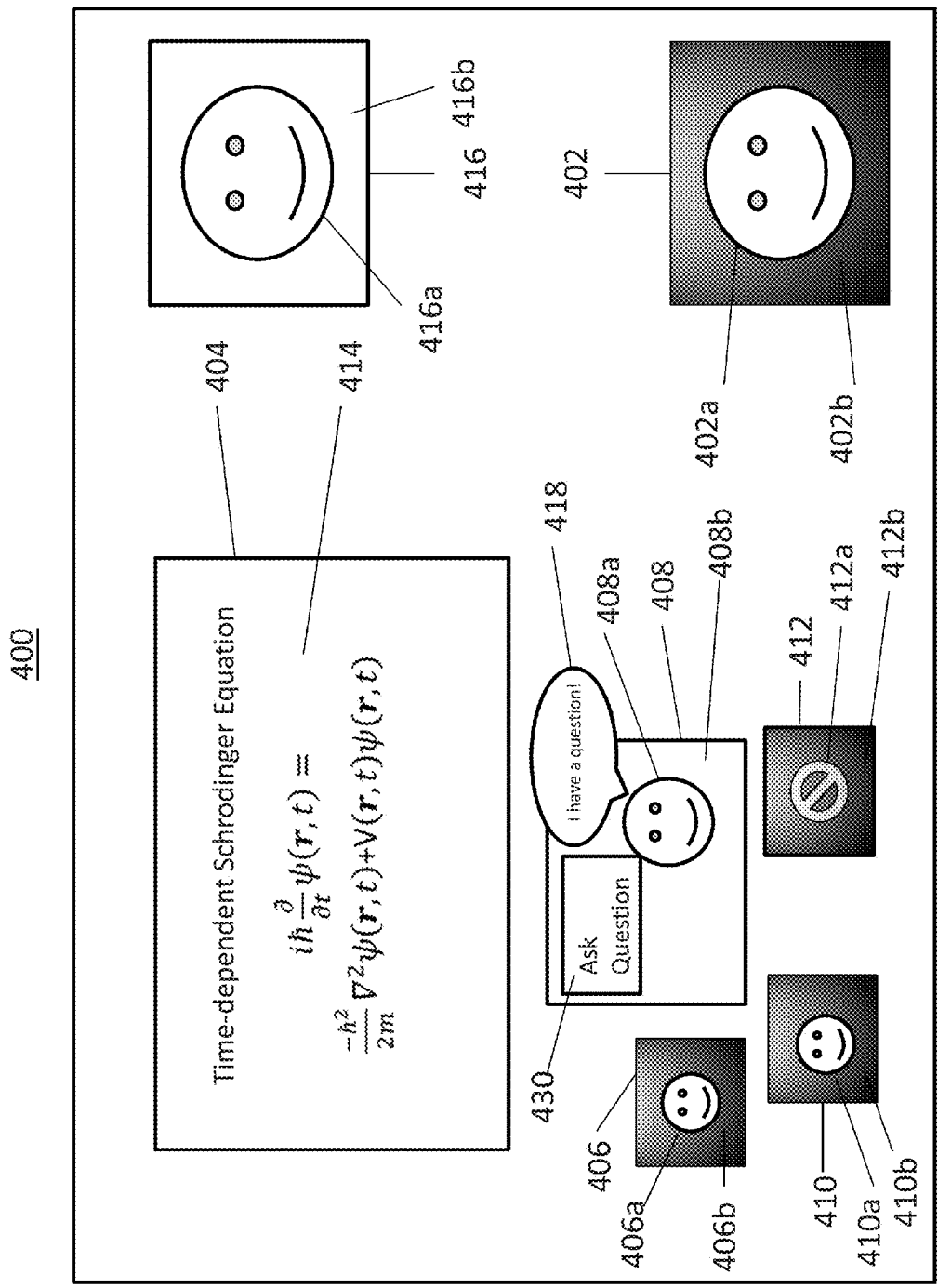
FIG. 4 is another illustrative diagram of a user interface displayed on a user device in accordance with various embodiments.

FIG. 4 is an illustrative diagram of user interface in accordance with various embodiments. User interface 400 may include content window 404, which, in some embodiments, may be substantially similar to content window 304 of FIG. 3 with the exception that content window 404 may include content 414. Content 414 can be any content that may be transmitted and/or presented to one or more users accessing user interface 400. For example, content 414 may be a slide from a slideshow, a lecture, live video, recorded video, live audio, recorded audio, or any other type of content that is presentable, or any combination thereof. In some embodiments, content 414 may be interactive allowing the presenter to modify one or more portions of content 414, as well as present the augmented portion(s) to the one or more users accessing user interface 400.

In some embodiments, user interface 400 may include one or more display windows, such as display windows 402, 406, 408, 410, and 412, which may be substantially similar to display windows 302, 306, 308, 310, and 312 of FIG. 3, and the previous description may also apply. A display window, such as display window 408, may include image 408a and/or background 408b. Image 408a may be substantially similar to image 208a of FIG. 2 and the previous description of the latter can apply to the former.

In some embodiments, display window 408 may include one or more interactive buttons, such as "Ask Question" button 430. The one or more interactive buttons may allow a user to provide an input to the server, another user, and/or both. For example, the user corresponding to display window 408 may press "Ask Question" button 430, which may signify that he/she would like to ask a question. In some embodiments, more than one display window may include one or more interactive buttons. This may allow one or more of the individuals accessing user interface 400 to provide one or more inputs. For example, one or more users in an online classroom may want to ask a question pertaining to the content presented within content window 404. The user or users may press "Ask Question" button 430, which may let the presenter, the system administrator, and/or the host to know that a participant may be attempting to ask a question. This can be extremely beneficial to users accessing an online classroom because they may now be able to interact with the presentation and/or understand any lingering queries that they may have regarding the presented content.

In some embodiments, one or more users accessing the user interface may provide inputs at approximately the same time. In the scenario, the inputs can be placed in an ordering module. In some embodiments, the ordering module may be located on the server (e.g., server 102 of FIG. 1) and/or on the network (e.g., network 106 of FIG. 1). The ordering module may determine the order in which the inputs have been provided, allowing each user to have their question asked (or answered) in a timely and orderly fashion. The use of the ordering module is merely exemplary, however, and any ordering process may be used to determine the ordering of more than one input provided by one or more users. For example, inputs may be assigned a priority order. In this scenario, a question that may be deemed more important may be asked prior to questions of lesser importance. As yet another example, different inputs may be assigned a content order. The content order may allow questions to be asked in order of relevancy to the content.

In some embodiments, in response to the user providing one or more inputs (e.g., pressing interactive button 430), a contextual communication may be presented to one or more additional users accessing user interface 400 and/or the presenter. For example, in response to the user of display window 408 pressing "Ask Question" button 430, the user may present contextual communications 418 to the presenter. In some embodiments, contextual communications 418 may be received by one or more of the other users and the presenter. The contextual communication may be any communication capable of being transmitted to and/or received by one or more users accessing user interface 400. For example, contextual communication 418 may be an SMS message, an MMS message, an email message, a text message, an instant message, a message over one or more social media platforms, an audio message, a video message, or any combination thereof.

In some embodiments, in response to the user providing one or more inputs (e.g., pressing interactive button 430), the user may be placed in an active mode of communication with one or more additional users accessing user interface 400. In some embodiments, placement of the user in the active mode of communication with one or more additional users may change the user's display window's background (e.g., background 408b) from the second state to a third state. In some embodiments, the third state may be substantially similar to the first state. For example, in response to the user pressing "Ask Question" button 430, background 408b may change to be fully lit, slightly dimmed (e.g., darker than the fully lit background but lighter than the dimmed background), enlarged, have a border change, or change the image in the background to be a live image, a recorded image, live video, or stored video, or any combination thereof. In some embodiments, in response to the user providing the input, the corresponding user's display window background may not change at all.

Figure 5:
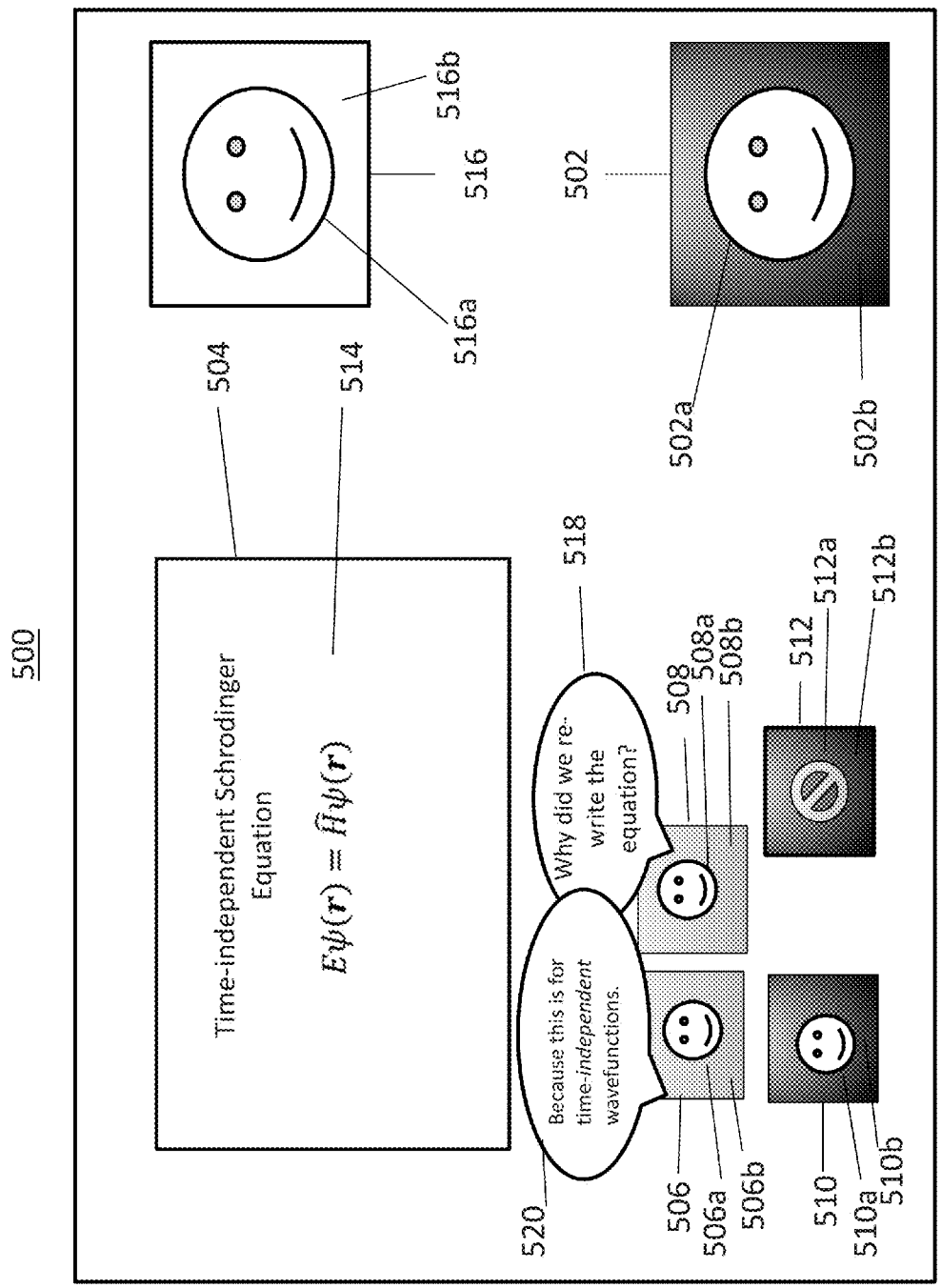
FIG. 5 is still another illustrative diagram of a user interface displayed on a user device in accordance with various embodiments.

FIG. 5 is an illustrative diagram of a user interface in accordance with various embodiments. User interface 500 may include content window 504, which may be substantially similar to content window 304 of FIG. 3 with the exception that content window 504 may include content 514. Content 514 may be any content that may be transmitted and/or presented to one or more users accessing user interface 500. For example, content 514 may be a slide from a slideshow, a lecture, live video, recorded video, live audio, recorded audio, or any other type of presentable content, or any combination thereof. In some embodiments, content 514 may be interactive allowing the presenter to modify one or more portions of content 514 and present the augmented portion(s) to the one or more users accessing user interface 500.

In some embodiments, user interface 500 can include one or more display windows, such as display windows 502, 506, 508, 510, and 512, which may be substantially similar to display windows 302, 306, 308, 310, and 312 of FIG. 3, and the previous description may apply. In some embodiments, two or more users accessing user interface 500 may form a group. For example, two users may decide to have a conversation or chat within the context of the presented content. The user may provide one or more inputs via their user device (e.g., user device 104 of FIG. 1), which may allow the user to form the group with one or more additional participants. For example, the user corresponding to a display window 508) may provide an input to display window 506, which may form a group with the user corresponding to display window 506. As another example, the user may provide one or more inputs to one or more additional display windows to form a group with the corresponding users of the additional display windows.

In some embodiments, the server (e.g., server 102 of FIG. 1) may recognize one or more similar characteristics of two or more users accessing user interface 500 and form a group based on these similar characteristics. For example, two or more users may access user interface 500 using one or more social media networks. The server may recognize that the two or more users may have attended the same university based on their social media network profiles and/or log-in information, and the users may be placed in a group with each other.

In some embodiments, the server may provide an option to one or more additional users to join a newly formed group. The user may form the group without providing an input to the one or more display windows corresponding to the one or more additional participants. The server may recognize that a new group has formed and, in response to the group formation, ask one or more additional participants who may be accessing user interface 500, but may not already be a group member, if they would like to join the newly formed group.

In some embodiments, in response to the user forming a group with one or more additional users, two or more group members may be placed in an intermediate mode of communication with each other. The intermediate mode of communication may enable users to transmit contextual communications to any other group member. Various types of contextual communications may include, but are not limited to, text messages, email messages, instant messages, social media network messages, or any other textual communication, or any combination thereof. In some embodiments, the intermediate mode of communication may allow one or more group members to transmit live audio, live video, recorded audio, recorded video, and/or images, or any combination thereof. The intermediate mode of communication may allow the two or more users in the group to receive communications from another group member, as well as the content 514 presented within display window 504. In some embodiments, upon formation of the group, the two or more group members may be placed in an active mode of communication with each other.

For example, a user (e.g., a user corresponding to display window 508) may click on a display window corresponding to another user (e.g., display window 506), and form a group with each other. In some embodiments, a request may be sent to the potential group members to determine if they would want to join the group. Upon acceptance of the request to form the group, the users corresponding to display windows 506 and 508 may be placed in a group with each other. Within the group the users may be able to transmit contextual communications to each other while continuing to receiving content 514. In some embodiments, the users (e.g., the users corresponding to display window 506 and 508) may be in an intermediate mode of communication with each other as well as separately be in an active mode of communication with the presenter. For example, the user corresponding to display window 508 may ask question 518 to the other user corresponding to display window 506. In response to being asked question 518, the user corresponding to display window 506 may respond back with answer 520. Question 518 and answer 520 may be transmitted and received in any suitable form. For example, question 518 and answer 520 may be typed via an instant message, an email, and/or via audio message.

In some embodiments, upon formation of the group, the group member's may have their respective backgrounds changed. For example, upon the users corresponding to display windows 506 and 508 being placed in a group with one another, their corresponding display window backgrounds 506*b* and 508*b* may change from the second state to a fourth state. The fourth state may, in some embodiments, be substantially similar to the third state, and the previous description may apply. In some embodiments, the fourth state may be a differ from the third state. For example, the fourth state may be darker than the first state and brighter than the second state.

In some embodiments, the group members may have their respective display window backgrounds changed from the second state to the fourth state and then be placed in the group with each other. In some embodiments, the group members may have their display window backgrounds changed from the second state to the fourth state automatically in response to the group formation. Additionally, in some embodiments, the group members may have their display window backgrounds change at substantially the same time as the formation of the group.

Figure 6:
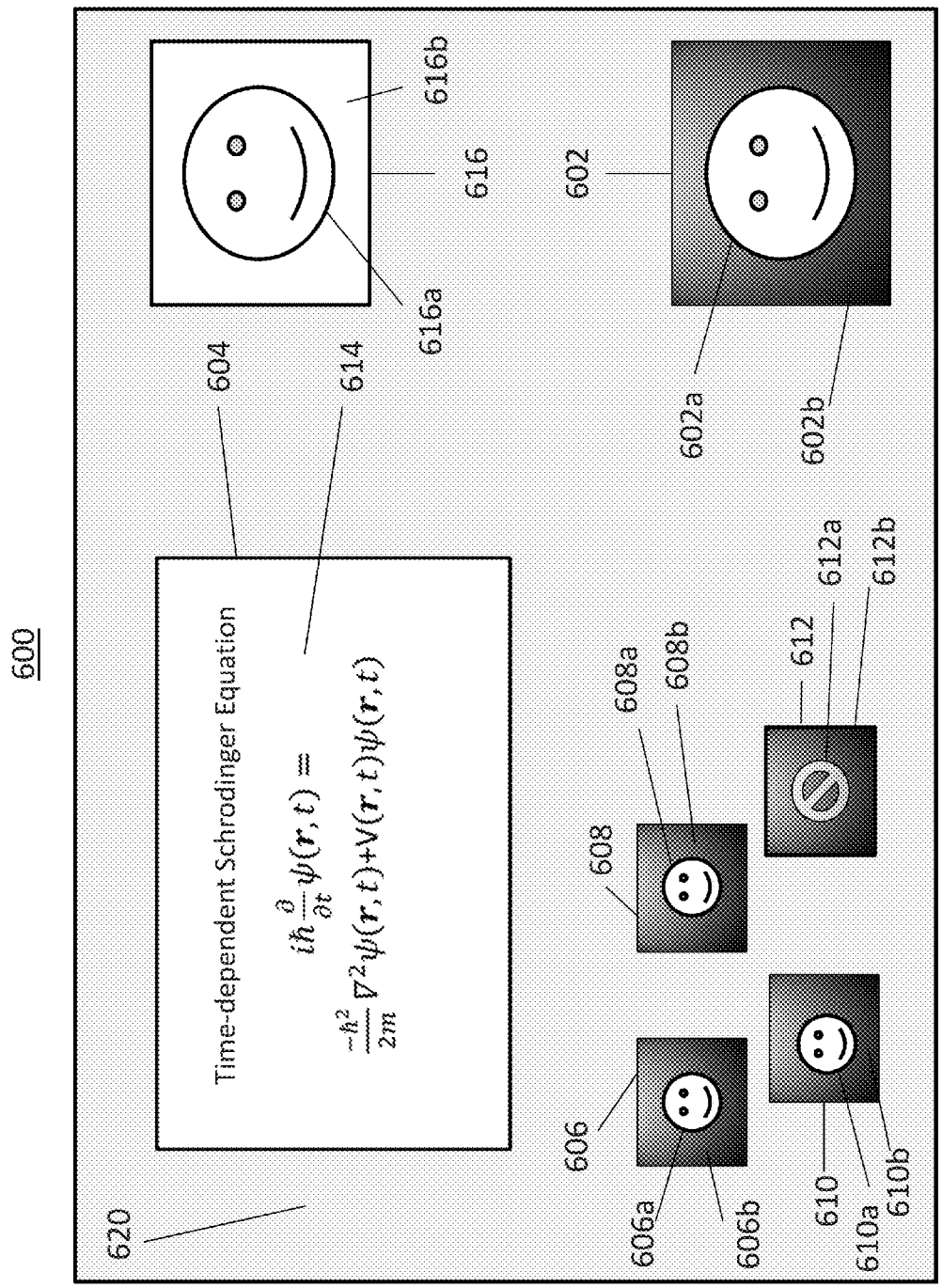
FIG. 6 is still yet another illustrative diagram of a user interface displayed on a user device in accordance with various embodiments.

FIG. 6 is an illustrative diagram of a user interface in accordance with various embodiments. In some embodiments, user interface 600 may include display windows 602, 606, 608, 610, 612 and 616, which may be substantially similar to display windows 302, 306, 308, 310, 312, and 316 of FIG. 3, and the previous description may apply. User interface 600 may also include content window 604, which may be substantially similar to content window 304 of FIG. 3 and the previous description may also apply.

In some embodiments, user interface 600 may differ from user interface 300 in that user interface 600 may have background 620 that may change from a first state to a second state. When background 620 is in the first state, the background may be a solid white background for the user interface, or any other solid monochromatic color, or any combination of colors, or any other static image. In some embodiments, background 620 in the first state may correspond to a stored image, a captured image, a live video, a recorded video, or any combination thereof displayed within the user interface. In some embodiments, background 620 in the second state may correspond to a solid white screen, or any other solid monochromatic color, any combination of colors, a stored image, a captured image, a live video, a recorded video, or any combination thereof. For example, user interface 200 of FIG. 2 may be in a first state prior to content window 204 (e.g., a solid white background) presenting content therein. In response to content being presented within content window 604, for example, background 620 may change from the first state to the second state (e.g., a solid gray background). In some embodiments, the first state and the second state may be substantially similar to each other.

In some embodiments, background 620 may change in response to a presentation being provided by a presenter, such as a presenter corresponding to display window 616. For example, a presenter may begin to present content (e.g., content 614) with content window 604. Once the presenter begins to present the content, background 620 may automatically change to the second state. In some embodiments, background 620 may change from the first state to the second state and, in response, the presenter may begin to present content 614 within content window 604. In some embodiments, background 620 may change from the first state to the second state at substantially the same time that content 614 may be presented.

In some embodiments, in addition to background 620 changing from the first state to the second state, display windows 602, 606, 608, 610, 612, and/or 616 may change from a third state to a fourth state. In some embodiments, the third state and the fourth state may be substantially similar to the first state and the second state described above regarding FIG. 3. For example, prior to content being displayed with content window 604, background 620 may be in the first state, and display windows 602, 606, 608, 610, 612, and/or 616 may be in a third state. As content 614 may begin to be presented with content window 604, background 620 may change from the first state to the second state, and display windows 602, 606, 608, 610, 612, and/or 616 may change from the third state to the fourth state. In some embodiments, the display windows may not change in response to the change of background 620. For example, background 620 may change from the first state to the second state; however display windows 602, 606, 608, 610, 612, and/or 616 may remain in the third state. In some embodiments, not all display windows may change from the third state to the fourth state as display background 620 changes from the first state to the second state. For example, display window 616 corresponding to the presenter, may remain in the third state while the other display windows (e.g., display windows 602, 606, 608, 610, and 612) and the user interface's background may change.

In some embodiments, upon background 620 changing from the first state to the second state, each user accessing user interface 600 may be placed in an active mode of communication with one or more of the other users accessing user interface 600. The active mode of communication may enable live video communications to be transmitted from the presenter to each user accessing user interface 600. The presenter may transmit content 614 to each user accessing user interface 600, and each user may be placed in the active mode of communication with the presenter.

In some embodiments, the presenter may be able to control one or more features of the users accessing the user interface. For example, the presenter may be able to place specific users into groups with one another. As another example, the presenter may change the background of one or more user display windows, the background of the user interface, and/or any other feature corresponding to the user interface. In some embodiments, the presenter may be at a live event corresponding to an event being transmitted within the user interface, and the presenter may be able to control the lighting effects of the entire room where the presentation may be presented as well as the lighting effects associated with the users accessing the user interface presenting the presentation. In this way, a single presenter may be able to control all aspects of the presentation, from the experience of the presentation attendees to the users accessing the presentation online.

Systems and methods for creating a virtual marketplace may be described herein as well.

Figure 7:
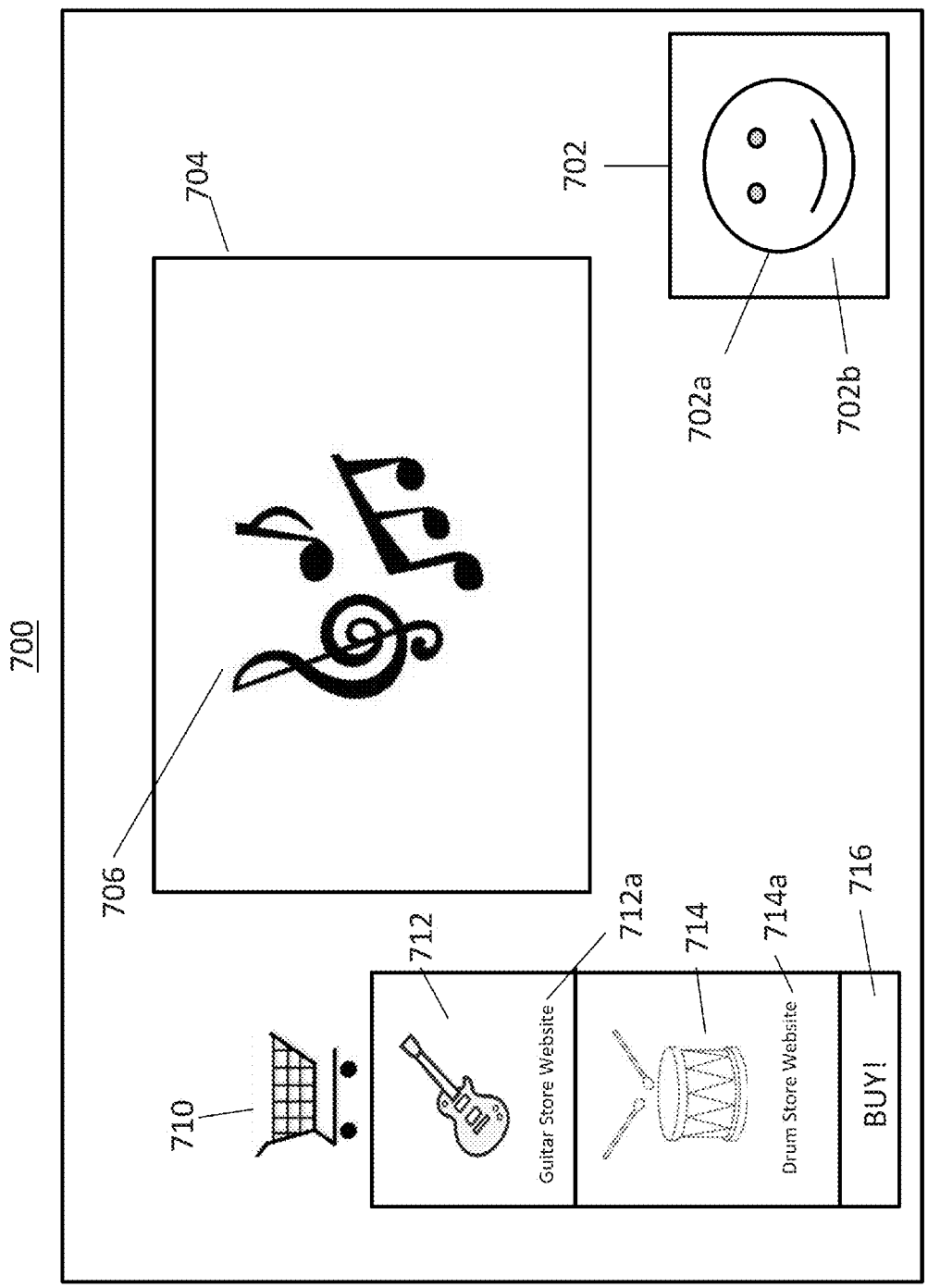
FIG. 7 is still yet another illustrative diagram of a user interface displayed on a user device in accordance with various embodiments.

FIG. 7 is an illustrative diagram of a user interface corresponding to a virtual marketplace in accordance with various embodiments. User interface 700 may include content window 704, which may present content 706 to any user accessing the user interface. User interface 700 may also include display window 702, image 702*a*, and background 702*b*. In some embodiments, content window 704, content 706, display window 702, image 702*a*, and background 702*b* may be substantially similar to content window 304, content 306, display window 302, image 302*a*, and background 302*b* of FIG. 3, with the exception that content 706 may relate to one or more products that a user may purchase.

In some embodiments, user interface 700 may include shopping cart 710. Shopping cart 710 may be any cart that allows a user or users to store and/or view items that may be purchases. In some embodiments, one or more products may be presented to any user accessing user interface 700. The one or more products may be presented to the user in any suitable manner. For example, various products may "pop-up" within user interface 700, and the user may select one or more of these products to place in his/her shopping cart 710. In some embodiments, one or more algorithms resident on the user device and/or on the server displaying user interface 700 may determine the genre or genres related to content 706, and in response, present one or more products to the user for purchase based on the determined content. For example, content 706 may be a live video stream of a concert. One or more components within the user device and/or the server may determine that the presented content may relate to music. In this scenario, various musical products may be presented to the user for purchase.

In some embodiments, the user may select the one or more products and place them within shopping basket 710. For example, content 706 may be a streaming concert, and the user may have been presented within various musical instruments for purchase. The user may select one or more products, such as products 712 and 714, and place these products within the user's shopping basket. In some embodiments, product information may be retrieved from various consumer websites. In some embodiments, within the shopping basket may be one or more links to websites and/or stores that may allow the user to purchase the items within the shopping basket. For example, the user may select product 712 and product 714, and within shopping basket 710 may be respective links 712*a* and 714*a*, which may allow the user to purchase the products via the links. In some embodiments, the user may have selected the products already from one or more websites, and complete the transaction by invoking buy button 716. At this point, the user may be asked to provide purchasing information (e.g., credit card information, billing address, shipping address, etc.) to complete the purchase of any products within shopping cart 710.

In some embodiments, one or more products may be displayed within the user interface when the user begins the shopping mode. For example, the server may determine one or more characteristics of the user and may display various products to the user based on the determined characteristics. The user may have a profile stored on the server and/or accessible by the server, which may include information relevant to the user's interests. For example, the user's profile may include the user's age and/or gender, and based on the user's age and/or gender, various vendor products may be displayed to the user that are typically purchased by other individuals having similar profile information. In some embodiments, various vendors may provide product information to the server to display within user interface 700 to target certain demographics.

In some embodiments, each participant accessing user interface 700 may view the items placed within shopping basket 710. For example, as a user selects a product, such as product 712, and places the product in their shopping basket, a notification to each additional user who may also be accessing user interface 700 may be provided. The notification may indicate to each additional participant that the user has selected product 712, allowing the other participants to comment on the product. This may help the user obtain opinions and/or comments related to the product or products they may want to purchase.

In some embodiments, the user may view one or more additional websites from within user interface 700. For example, as the user may be watching a streaming concert online (e.g., content 706 displayed within content window 704), the user may also open an internet browser within user interface 700. This may allow the user to simultaneously shop for various products while viewing the displayed content. The user may then select any product from the open browser that he/she may desire to purchase, and place the product within shopping cart 710. This may allow the user to purchase items while within the experience provided by content 706. In some embodiments, the one or more products may be stored within the shopping cart until a later point, when the user may want to review/purchase the products. In some embodiments, the user may open a browser outside of user interface 700, and may view one or more additional products for purchase from within the outside browser.

In some embodiments, shopping basket 710 may store the product data, such as a product's cost and/or a link where to purchase the product, within the shopping basket after the user may no longer be accessing user interface 700. Shopping basket 710 may store the product information on a user's profile and/or within a user's account on the server. In this way, the user may access the product information and or decide to purchase the one or more products at any point. In some embodiments, the shopping basket may be cleared periodically by the system and/or by the user to remove unwanted products, or to clear memory. The amount of time that a product may remain within shopping basket 710 may be determined by the user. For example, the user may select an option of one year retention, and thus products selected and/or placed within the shopping basket may remain therein for a year.

Figure 8:
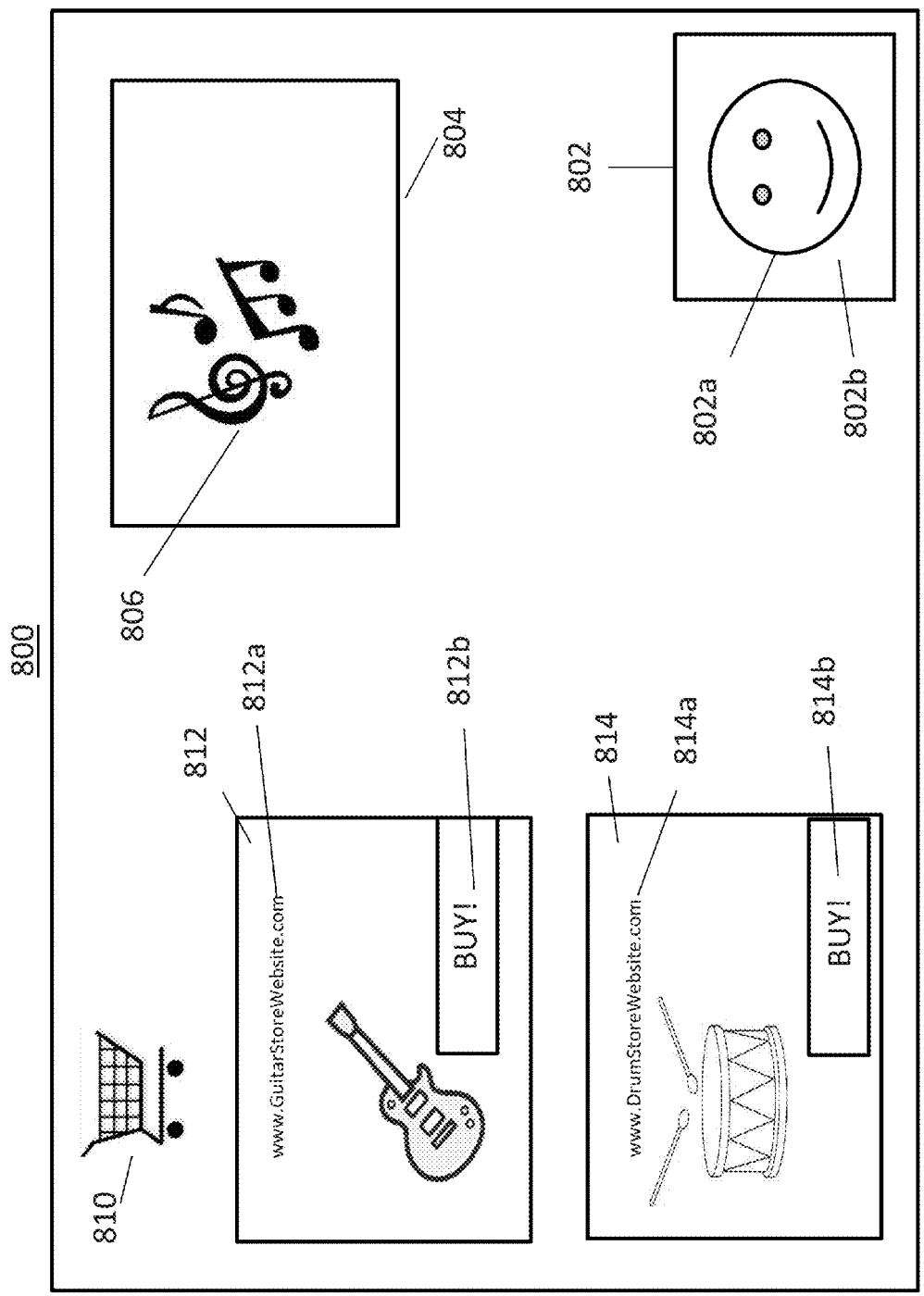
FIG. 8 is further still another illustrative diagram of a user interface displayed on a user device in accordance with various embodiments.

FIG. 8 is an illustrative diagram of a user interface corresponding to a virtual market place for a user to purchase products in accordance with various embodiments. User interface 800 may include content window 804, content 806, display window 802, image 802*a*, and background 802*b*, which may be substantially similar to content window 304, content 306, display window 302, image 302*a*, and background 302*b* of FIG. 3, and the previous description may apply. In some embodiments, user interface 800 may include shopping cart 810, products 812 and 814, and product links 812*a* and 814*a*, which may be substantially similar to shopping cart 710, products 712 and 714, and product links 712*a* and 714*a* of FIG. 7, with the exception that products 812 and 814 may now be presented one after another to the user.

In some embodiments, the user may click on shopping cart 810 and be presented with each relevant link to each product the user may have placed within the shopping cart. For example, product 812 may have been selected and placed within shopping cart 810 prior to product 814. In response to selecting shopping cart 810, links to the relevant website or websites where the user may purchase product 812 may be presented to the user within user interface 800. In some embodiments, the links to the relevant websites may each open in a separate browser tab outside of user interface 800. In some embodiments, a referral code and/or a promotional discount may be added to the user's purchase price in response to a determination that the user has attempted to, or may decide to purchase a product via user interface 800.

In some embodiments, the user may be able to purchase each product from within the individual website by selecting "Buy" buttons 812*a* and/or 814*b*. This may allow the user the dynamic market place environment to not only view content 806, but also purchase products. In some embodiments, each link (e.g., links 812*a* and 814*a*) may be displayed to the user in the order within which they had been placed into shopping cart 810. This may allow the user to view the products in the order which they have been selected as well as also providing an orderly manner for the viewing and purchasing the various products.

In some embodiments, one or more algorithms on the user device and/or the service may be able to determine whether or not one or more of the selected products are related. For example, the user may select a TV from Store A, a shirt from Store B, and then a radio also from Store A. In some embodiments, both the TV and the radio may be presented to the user together because they are both from Store A. this may a user may not have to go to the website or link corresponding to both the TV and the radio in order to complete the purchase.

In some embodiments, one or more additional products may be presented to the user within the displayed product links. For example, if the user has searched or viewed musical instruments, such as guitars, within one retailer's website, then additional music instruments related to and/or associated with any selected item may also be displayed to the user within the website. This may allow the user to view not only products that they want to purchase, but also may intelligently anticipate any products with which they may also need and/or want with the purchase of the one or more selected products. For example, the user may select an electric guitar to purchase, and the website may present guitar amplifiers, chords, and/or guitar strings to the user for possible additional purchase.

Figure 9:
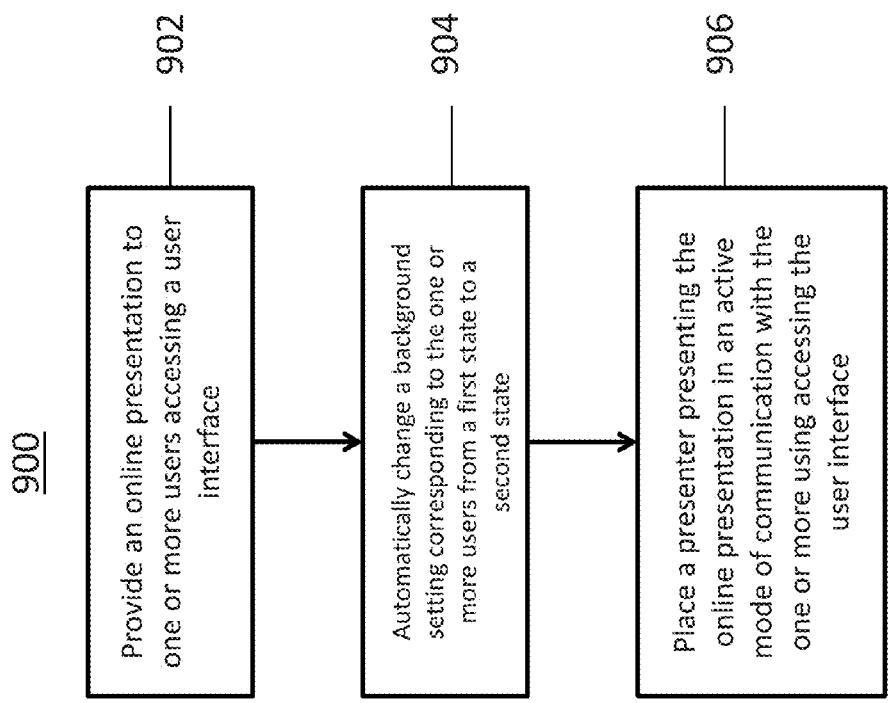
FIG. 9 is an illustrative flowchart of a process for modifying a background of a user interface associated with an online presentation in accordance with some embodiments.

FIG. 9 is an illustrative flowchart of a process for automatically changing a background for users accessing a user interface in accordance with various embodiments. Process 900 may begin at step 902. At step 902, a presentation may be provided from a presenter to one or more users accessing a user interface. In some embodiments, the presentation may include content, such as content 314 of FIG. 3. Various types of content may include, but are not limited to, slides from a slide show, lectures including slides, live video, recorded video, live audio, recorded audio, or any other type of presentable content, or any combination thereof. In some embodiments, the presentation may be interactive and/or dynamic, and the content can be modified by the presenter and/or one or more users. In some embodiments, the modified content may be presented to the one or more users accessing the user interface.

At step 904, a background setting corresponding to each user accessing the user interface may automatically change from a first state to a second state. In some embodiments, each user may have a corresponding display window (e.g., display window 202 of FIG. 2) displayed within the user interface (e.g., user interface 200 of FIG. 2). Each display window may include an image (e.g., image 202*a* of FIG. 2) and a background (e.g., background 202*b* of FIG. 2). In some embodiments, in response to the presentation being provided, the background may change from the first state (e.g., background 202*b* of FIG. 2) to the second state (e.g., background 302*b* of FIG. 3). For example, in the first state the display window(s) may have a background that may be fully lit. Continuing with this example, in the second state, the display window(s) may have a dimmed background (e.g., or darker than the first state). Various backgrounds corresponding to the first state may include, but are not limited to include, live video, recorded video, one or more captured images, one or more stored images, or any other type of background, or any combination thereof, which used to obtain an image of a user corresponding to the display window (e.g., image 202*a* of FIG. 2). The second state may include, but is not limited to include, live video, one or more captured images, one or more stored images, or any other suitable image, or any combination thereof, which may be used to obtain an image of the corresponding user. In some embodiments, the background corresponding to the second state may be differ from the background corresponding to the first state. In some embodiments, the first state and the second state may be substantially similar.

At step 906, the presenter may be placed in an active mode of communication with one or more users accessing the user interface. In some embodiments, the active mode of communication may enable live video communications to be transmitted from the presenter to the one or more users accessing the user interface. In some embodiments, the active mode of communication may allow the presenter (e.g., a presenter corresponding to display window 316 of FIG. 3) to transmit content (e.g., content 314 of FIG. 3) to one or more users accessing the user interface. For example, the presenter may transmit content 314 to one or more users accessing a user interface 300. In some embodiments, the presenter may then be placed in the active mode of communication with one or more users, or each user, so that the transmitted content may be received by the user(s) at a higher priority level than other communications.

Although process 900 shows steps 902, 904, and 906 in succession, persons of ordinary skill in the art will recognize that one or more steps can be rearranged, modified, and/or omitted. For example, step 904 and/or step 906 may be performed prior to step 902. In this particular scenario, the background setting of the one or more users accessing the user interface may change from the first state to the second state, and then the presentation may be provided the one or more users accessing the user interface. Continuing this example, the presenter may be placed in the active mode of communication with the one or more users in response to the background setting changing and/or in response to the presentation being provided. As another example, steps 902, 904, and/or 906 may all occur at substantially the same time. For example, the presentation may be provided from the presenter to the one or more users accessing the user interface, and the background settings of the one or more users may change from the first state to the second state in addition to the users being placed in the active mode of communication with the presenter.

In some embodiments, a first input may be provided by a first user accessing the user interface. For example, a user accessing a user interface 400 may want to ask a question.

The user may click on one or more interactive buttons (e.g., "Ask Question" button 430 of FIG. 4) and in response to clicking the one or button, ask a question (e.g., question 418 of FIG. 4).

In some embodiments, more than one user may provide one or more inputs. For example, two or more users may both click on a corresponding interactive button or buttons to provide the inputs, such as "Ask Question" button 430 of FIG. 4. The inputs can be transmitted using the user's device (e.g., user devices 104 of FIG. 1) to the server (e.g., server 102 of FIG. 1). In some embodiments, an ordering module located on the server and/or one or more of the user devices may determine the ordering of the received inputs. For example, if two users both click on their corresponding "Ask Question" button 430, the two inputs may be received by the ordering module. The ordering module may determine a best mode for transmitting the inputs to either the presenter, one or more additional users accessing the display window, or the server, based on one or more factors. For example, the ordering module may determine which input came first, and allow the user corresponding to that input to ask their question first. As another example, the ordering module may determine a priority level for each question. The priority level may determine the most relevant question to the content being discussed, or the question that has a greater level of complexity, or any other suitable means of ordering or categorizing, or any combination thereof, and transmit the questions in order based on the determined priority level.

In some embodiments, one or more users accessing the user interface may provide one or more inputs and, in response, a background setting corresponding to the one or more users may change from the second state to a third state. In some embodiments, the one or more users may provide the one or more inputs by clicking one or more interactive buttons (e.g., "Ask Question" button 430 of FIG. 4) and, in response to clicking the one or more interactive buttons, the corresponding user's background and/or users' backgrounds may change from the second state to the third state (e.g., background 408*b* of FIG. 4). For example, a user receiving content 414 may want to ask a question and/or make a comment. In response to the user clicking "Ask Question" button 430, the user's corresponding display window background may change from having a dimmed background (e.g., background 308*b* of FIG. 3) to a fully lit background (e.g., background 408*b* of FIG. 4). As another example, in response to the user clicking on "Ask Question" button 430, the user's corresponding display window background may change from having a dimmed background to a slightly less dimmed background, which may be darker than the fully lit background and/or brighter than the dimmed background.

In some embodiments, one or more users accessing the user interface may provide one or more inputs and, in response, the user(s) may be placed in the active mode of communication with one or more additional users accessing the user interface. In some embodiments, in response to providing the one or more inputs, the user(s) may be placed in the active mode of communication with the presenter and/or one or more additional users accessing the user interface. The active mode of communication may enable live video communication to be transmitted from the presenter to one or more users accessing the user interface. In some embodiments, the presenter may transmit content (e.g., content 414) to each user accessing the user interface (e.g., user interface 400) and each user may be placed in the active mode of communication with the presenter. For example, the user corresponding to display window 408 may click "Ask Question" button 430 of FIG. 4 and, in response, may be placed in the active mode of communication with the presenter and/or one or more additional users accessing user interface 400.

In some embodiments, the one or more users accessing the user interface may provide one or more inputs and, in response, the user(s) may be placed in an intermediate mode of communication with one or more additional users accessing the user interface. In some embodiments, the user(s) may be placed in the intermediate mode of communication with the presenter and/or one or more users. The intermediate mode of communication may enable the user(s) and/or the presenter to transmit and/or receive contextual communications to each other. Various types of contextual communications may include, but are not limited to, text messages, email messages, instant messages, social media messages, live audio, live video, recorded audio, recorded video, images, or any other type of communication, or any combination thereof. For example, a first user (e.g., a user corresponding to display window 508 of FIG. 5) may provide an input to a second user (e.g., user corresponding to display window 506) and in response to providing the input, the first and second user can be placed in an intermediate mode of communication with one another. Once in the intermediate mode of communication, the first user may be able to communicate with the second user (e.g., ask question 518), and the second user may be able to respond (e.g., answer 520 of FIG. 5).

In some embodiments, the intermediate mode of communication may include intermittent video communication with a substantially low refresh rate. In some embodiments, the intermediate mode of communications may include intermittent video communications with a substantially high refresh rate. The refresh rate of the intermittent video can be based on one or more factors. For example, the refresh rate of the intermittent video may be determined based on available bandwidth (e.g., low bandwidth, medium bandwidth, high bandwidth). As another example, the refresh rate may dynamically change as the available bandwidth changes.

Figure 10:
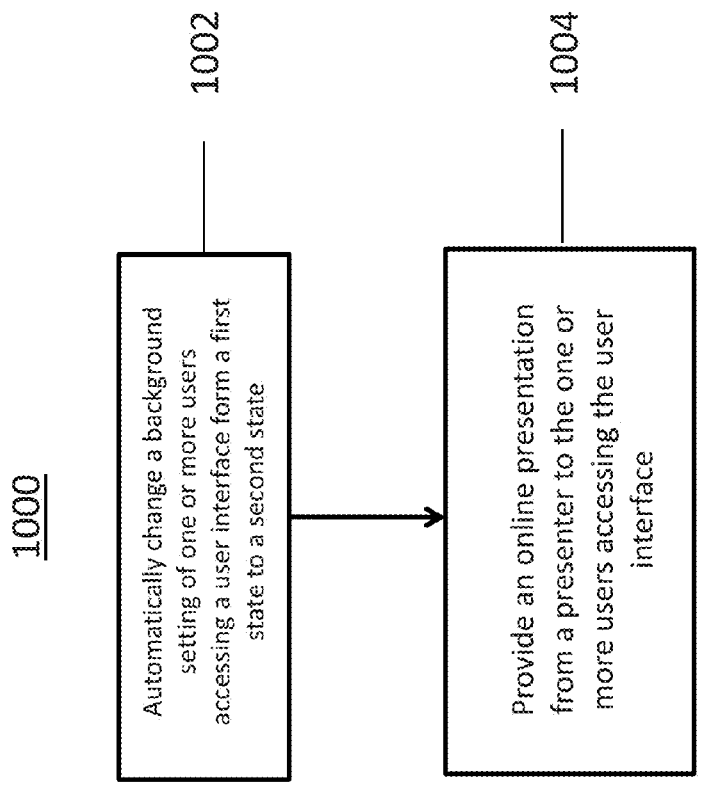
FIG. 10 is another illustrative flowchart of a process for modifying backgrounds of user display windows within a user interface associated with an online presentation in accordance with some embodiments.

FIG. 10 is another illustrative flowchart of a process for providing a presentation to one or more users accessing a user interface in accordance with various embodiments. Process 1000 may begin at step 1002. At step 1002, a background setting corresponding to one or more users accessing a user interface may automatically change from a first state to a second state. For example, the user interface may include one or more display windows, such as display windows 202, 206, 208, 210, and 212 of FIG. 2, which may each include an image and a background, such as images 202*a*, 206*a*, 208*a*, 210*a*, and 212*a* and backgrounds 202*b*, 206*b*, 208*b*, 210*b*, and 212*b*, respectively. The background of one or more user display windows may automatically change from the first state (e.g., background 202*b* of FIG. 2) to the second state (e.g., background 302*b* of FIG. 3).

For example, the display windows in the first state may have backgrounds that are fully lit. The display windows having in the second state may have backgrounds that are dimmed relative to the first state. In some embodiments, the first state and/or the second state may correspond to the background including live video, recorded video, one or more captured images, one or more stored images, or any combination thereof used to obtain an image of a user having a corresponding display window. In some embodiments, the first and second states may be slightly different from one another. In some embodiments, the first state and the second state may be substantially similar.

At step 1004, a presentation may be provided from a presenter to the one or more users accessing the user interface. In some embodiments, the presentation may be provided in response to the background change. For example, the presentation (e.g., content 306) may be presented within a content window (e.g., content window 304). Various types of content may include, for example, slides, lectures, live video, recorded video, live audio, recorded audio, or any other type of presentable content, or any combination thereof. In some embodiments, the presentation may be interactive, and the content can be modified. In this scenario, one or more users and/or the presenter may modify the content and present the content to the one or more users and/or the presenter.

In some embodiments, process 1000 may include placing the presenter in an active mode of communication with one or more users accessing the user interface. In some embodiments, the active mode of communication may enable live video communication to be transmitted from the presenter to the one or more users accessing the user interface. In some embodiments, the one or more users accessing the user interface may be placed in the active mode of communication with the presenter to receive the presented content. In some embodiments, the transmitted content may be given a higher priority level then other content or activities, providing a higher confidence level that the content will be received.

In some embodiments, process 1000 may include a first input being provided via a first user accessing the user interface. The first input may be provided by the user using a user device (e.g., user device 104 of FIG. 1). In some embodiments, the first user may provide the first input using one or more interactive buttons located on the user interface and/or within the first user's corresponding display window (e.g., "Ask Question" button 430 of FIG. 4). In some embodiments, in response to providing the first input, the background setting corresponding to the first user may change from the second state to a third state. The third state may correspond to the user's display window having a background that may be brighter than the background in the second state and darker than the background in the first state. In some embodiments, in response to the first input being provided, two or more users accessing the user interface may have their display window backgrounds changed from the second state to the third state. For example, in response to the first input being provided, each user accessing the user interface may have their display window background change from the second state to the first state.

In some embodiments, process 1000 may include a first input being provided via a first user, which may place the first user in an active mode of communication with one or more additional users accessing the user interface and/or the presenter. For example, the first user may provide an input by clicking one or more interactive buttons (e.g., "Ask Question" button 430) and, in response, each user accessing the user interface (e.g., user interface 400) may be placed in the active mode of communication with the other users and/or the presenter. As another example, upon providing the input, one or more users and/or the presenter may be placed in the active mode of communication with the first user.

FIG. 11 is an illustrative flowchart of a process for changing a display window background corresponding to one or more users accessing a user interface in accordance with various embodiments. Process 1100 may begin at step 1102. At step 1102, an online presentation can be provided from a presenter to one or more users accessing the user interface. The presentation may include content, such as content 614. For example, the content may be one or more slides, and the presentation may be a lecture including the one or more slides. Various other types of content may include, but are not limited to, live video, recorded video, live audio, recorded audio, or any other type of presentable content, or any combination thereof. In some embodiments, the presentation may be interactive and the content may be modified. In this scenario, the one or more users and/or the presenter mat modify the content and present the modified content to the one or more users accessing the user interface.

At step 904, a background setting corresponding to the user interface may automatically change from a first state to a second state. For example, user interface 200 of FIG. 2 may have a background that is in a first state, whereas user interface 600 of FIG. 6 may have background 620 in a second state. In some embodiments, the background in the first state may include live video, recorded video, one or more captured images, one or more stored images, or any other background, or any combination thereof. In some embodiments, the background corresponding to the first state may also include one or more chromatic colors (e.g., solid red or blue). In some embodiments, the background in the second state may include live video, one or more captured images, one or more stored images, or any combination thereof, which may be slightly different than the background corresponding to the first state. In some embodiments, however, the first state and the second state may be substantially similar.

At step 1106, the presenter may be placed in an active mode of communication with the one or more users accessing the user interface. The active mode of communication may enable live video communications to be transmitted from the presenter to one or more users accessing the user interface. In some embodiments, the active mode of communication may allow the presenter (e.g., a presenter corresponding to display window 616 of FIG. 6) to transmit content (e.g., content 614 of FIG. 3) to one or more of the users.

At step 1108, the one or more users may have a background setting of their display windows automatically changed from a third state to a fourth state. In some embodiments, in response to placing the presenter in the active mode of communication with the one or more users, the display window backgrounds corresponding to the one or more users may change from a third state to a fourth state (e.g., background 620 of FIG. 6). For example, in the third state, the display window background may be fully lit. Continuing with this example, in the fourth state the display window background may be dimmed relative to the fully lit background. In the third state, the background may include live video, recorded video, one or more captured images, one or more stored images, or any combination thereof used to obtain an image of the corresponding user (e.g., image 202*a* of FIG. 2). The fourth state may also include live video, one or more captured images, one or more stored images, or any combination thereof used to obtain an image of a corresponding user, however the fourth state may be slightly different than the first state. Additionally, in some embodiments, the third state and the fourth state may be substantially similar. In some embodiments, the first state and the third state, as well as the second state and the fourth state, may be substantially similar.

It should be appreciated that the various embodiments described above can be implemented by software, but can also be implemented in hardware or a combination of hardware and software. The various systems described above can also be embodied as computer readable code on a computer readable medium. The computer readable medium can be any data storage device that can store data, and that can thereafter be read by a computer system. Examples of a computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The above described embodiments are presented for purposes of illustration only, and not of limitation.

What is claimed is:

1. A method comprising:
   generating, at a server, a user interface, the user interface comprising:
   a presentation window for presenting an online presentation;
   a presenter window for presenting a representation of a presenter; and
   a plurality of user display windows, wherein each user display window displays a representation of a user of a plurality of users, wherein each window of the presentation window, presenter window, and the plurality of user display windows has a background image, each background image comprising a background setting, the background setting being in a first state;
   providing the user interface to a plurality of user devices, wherein each user device corresponds to a user of the plurality of users;
   placing the presenter in an active mode of communication with each user of the plurality of users, the active mode of communication enabling at least live video communications to be transmitted from the presenter to the plurality of users;
   providing the online presentation from the presenter to the plurality of users accessing the user interface; and
   changing, automatically, in response to placing the presenter in the active mode of communication with each user, the background setting of each user display window from the first state to a second state while maintaining the background setting of the presenter window in the first state, wherein the first state comprises a fully lit background image displayed in the user interface and the second state comprises a dimmed background image displayed in the user interface, the dimmed background image being darker relative to the fully lit background image.

2. The method of claim 1, wherein the online presentation comprises the live video communications.

3. The method of claim 1, further comprising:
   receiving, while the presenter is in the active mode of communication, a first input provided by a first user of the plurality of users via a button generated in the user interface.

4. The method of claim 3, further comprising:
   in response to receiving the first input, changing the background setting of the display window associated with the first user from the second state to a third state.

5. The method of claim 4, wherein:
   the third state comprises a darker background image setting relative to the first state and a brighter background image relative to the second state displayed in the user interface.

6. The method of claim 4, further comprising: in further response to receiving the first input, placing the first user in an active mode of communication with each of the other users of the plurality of users and the presenter.

7. The method of claim 1, further comprising:
   receiving a first input provided by a first user of the plurality of users, the input indicating a second user of the plurality of users; and
   placing, in response to receiving the first input, the first user in an intermediate mode of communication with the second user, the intermediate mode of communication enabling the first user and the second user to transmit at least contextual communication to each other.

8. The method of claim 7, wherein the intermediate mode of communication further enables the first user and second user to transmit audio communication to each other.

9. The method of claim 7, wherein the intermediate mode of communication further enables the first user and the second user to transmit intermittent video communications with a substantially low refresh rate.

10. The method of claim 9, wherein the substantially low refresh rate is determined based on available bandwidth.

11. The method of claim 1, wherein the online presentation comprises at least one of an audio communication and a visual communication.

12. A system comprising:
    a communications server configured by stored instructions to generate a user interface, the user interface comprising:
    a presentation window for presenting an online presentation;
    a presenter window for presenting a representation of a presenter; and
    a plurality of user display windows, wherein each user display window displays a representation of a user of a plurality of users, wherein each window of the presentation window, presenter window, and the plurality of user display windows has a background image, each background image comprising a background setting, the background setting being in a first state;
    a presenter user device corresponding to a presenter, the presenter user device operable to provide the online presentation;
    a plurality of participant user devices accessing the user interface, wherein each user display window in the user interface corresponds to a particular participant user device;
    the communications server further configured by stored instructions to:
    receive the online presentation from the presenter user device;
    provide the user interface to a plurality of user devices, wherein each user device corresponds to a user of the plurality of users;
    place the presenter user device in an active mode of communication with each participant user device of the plurality of participant user devices, the active mode of communication enabling at least live video communications to be transmitted from the presenter user device to the plurality of participant user devices; and
    provide the online presentation via the user interface to each of the plurality of participant user devices;
    change, automatically, in response to placing the presenter user device in an active mode of communication with each participant user device of the plurality of participant user devices, the background setting of each user display window from the first state to a second state while maintaining the background setting of the presenter window in the first state, wherein the first state comprises a fully lit background image displayed in the user interface and the second state comprises a dimmed background image displayed in the user interface, the dimmed background image being darker relative to the fully lit background image.

13. The system of claim 12, wherein the at least one participant user device comprises:
a display;
an input interface;
an output interface; and
communications circuitry.

14. The system of claim 13, wherein:
the live video communications comprises the online presentation; and
the online presentation is displayed on the display of the at least one participant user device.

15. The system of claim 12, wherein the each user display window corresponding to each particular participant user device is viewable by participant user device accessing the user interface.

16. The system of claim 12, wherein the communications server is further configured by stored instructions to receive a first input provided by a first participant user device of the plurality of user devices and in response to receiving the first input, change the user display window corresponding to the first participant user device from the second state to a third state.

17. The system of claim 16, wherein:
the third state comprises a background image displayed in the user interface that is at least one of brighter than the second state and darker than the first state.

18. The system of claim 12, wherein the communications server is further configured by stored instructions to receive a first input provided by a first participant user device of the plurality of user devices, the first input indicating a second user, and in response to receiving the first input, place the first participant user device in an intermediate mode of communication with a second participant user device, the intermediate mode enabling the first participant user device and the second participant user device to transmit at least contextual communications to each other.

19. The system of claim 12, wherein communications server receives a first input provided by the presenter user device and, in response:
places the presenter user device and a first participant user device of the at least one participant user device in an intermediate mode of communication with each other, the intermediate mode of communication enabling the presenter user device and the first participant user device to transmit at least contextual communication to each other.

20. The system of claim 19, wherein placing the presenter user device and the first participant user device in the intermediate mode of communication enables each of the other participant user devices to receive the contextual communications.

21. A non-transitory computer readable medium containing instructions that, when executed by at least one processor of a user device, cause the user device to:

generate, at a server, a user interface, the user interface comprising:
a presentation window for presenting an online presentation;
a presenter window for presenting a representation of a presenter; and
a plurality of user display windows, wherein each user display window displays a representation of a user of a plurality of users, wherein each window of the presentation window, presenter window, and the plurality of user display windows has a background image, each background image comprising a background setting, the background setting being in a first state;
provide the user interface to a plurality of user devices, wherein each user device corresponds to a user of the plurality of users;
place the presenter in an active mode of communication with each user of the plurality of users, the active mode of communication enabling at least live video communications to be transmitted from the presenter to each user of the plurality of users;
provide the online presentation from the presenter to the plurality of users accessing the user interface; and
change, automatically, in response to placing the presenter in an active mode of communication, the background setting of each user display window from the first state to a second state while maintaining the background setting of the presenter window in the first state, wherein the first state comprises a fully lit background image displayed in the user interface and the second state comprises a dimmed background image displayed in the user interface, the dimmed background image being darker relative to the fully lit background image.

22. The non-transitory computer readable medium of claim 21, wherein the online presentation comprises live video communications.

23. The non-transitory computer readable medium of claim 21, wherein the instructions further cause the user device to:
receive a first input provided by a first user of the plurality of users, the first input indicating a second user of the plurality of users; and
place, in response to the receiving the first input, the first user in an intermediate mode of communication with the second user, the intermediate mode enabling the first user and the second user to transmit at least contextual communication to each other.

24. The non-transitory computer readable medium of claim 23, wherein placing the first user and the second user in the intermediate mode of communication comprises enabling the first user and the second user to transmit audio communication to each other.

25. The non-transitory computer readable medium of claim 23, wherein the intermediate mode of communication comprises intermittent video communications with a substantially low refresh rate.

26. The non-transitory computer readable medium of claim 25, wherein the substantially low refresh rate is determined based on available bandwidth.

* * * * *